US00RE50203E

(19) United States
(12) Reissued Patent
South et al.

(10) Patent Number: US RE50,203 E
(45) Date of Reissued Patent: Nov. 12, 2024

(54) AIRFORM FOR FACILITATING CONSTRUCTION OF A STRUCTURE

(71) Applicant: South Industries, Inc., Menan, ID (US)

(72) Inventors: Andrew John South, Menan, ID (US); Randy John South, Menan, ID (US); Derek Thomas South, Rigby, ID (US); Joshua Eric South, Menan, ID (US); Nathan Samuel South, Menan, ID (US); Jonathan William South, Menan, ID (US)

(73) Assignee: South Industries, Inc., Menan, ID (US)

(21) Appl. No.: 16/192,285

(22) Filed: Nov. 15, 2018

Related U.S. Patent Documents

Reissue of:
(64) Patent No.: 9,493,939
Issued: Nov. 15, 2016
Appl. No.: 14/341,688
Filed: Jul. 25, 2014

(51) Int. Cl.
*E04B 1/16* (2006.01)
*E04B 1/00* (2006.01)
(Continued)

(52) U.S. Cl.
CPC ..... *E04B 1/166* (2013.01); *E04B 1/169* (2013.01); *E04H 15/20* (2013.01);
(Continued)

(58) Field of Classification Search
None
See application file for complete search history.

(56) References Cited

U.S. PATENT DOCUMENTS 1,861,069 A * 5/1932 Smith ..... E04B 1/346 52/65
2,649,101 A * 8/1953 Suits ..... E04H 15/22 52/2.16
(Continued)

FOREIGN PATENT DOCUMENTS

CA 1088339 A1 10/1980
CH 693679 A5 * 12/2003 ..... E04G 11/04
(Continued)

OTHER PUBLICATIONS

Photo A: Image of a PVC fabric being hoisted into position for use as a temporary form, 2012.
(Continued)

*Primary Examiner* — Glenn K Dawson
(74) *Attorney, Agent, or Firm* — Ryan L. Marshall; Jessica Kiser; Barnes & Thornburg LLP

(57) ABSTRACT

An airform that can be inflated, for example, for facilitating construction of a structure is provided. The airform may include a first portion, a second portion, or multiple other portions, and reinforcement. The first portion may, for example, be configured to be disposed in a first orientation, such as vertically or in a radial profile, when the airform is inflated. The second portion transitioning from the first portion may be configured, for example, to assume an alternate shape and profile, such as a radial shape and profile, when the airform is inflated. The reinforcement may, for example, be provided at a portion of the airform that defines a transition from the first portion to the second portion.

24 Claims, 15 Drawing Sheets

(51) Int. Cl.
*E04B 1/32* (2006.01)
*E04H 15/20* (2006.01)

(52) U.S. Cl.
CPC ..... *E04B 2001/0061* (2013.01); *E04B 2001/3264* (2013.01); *E04H 2015/201* (2013.01); *E04H 2015/202* (2013.01); *E04H 2015/203* (2013.01); *E04H 2015/204* (2013.01); *E04H 2015/205* (2013.01)

(56) References Cited

U.S. PATENT DOCUMENTS 2,754,836 A * 7/1956 Augustus ..... E04H 15/324 52/2.21
2,812,769 A * 11/1957 Schaefer et al. ..... E04H 15/20 52/2.15
2,921,592 A * 1/1960 Mackey ..... E04H 15/22 29/430
3,106,772 A * 10/1963 Holcombe ..... E04B 1/3205 29/429
3,231,644 A * 1/1966 Ming-Yang ..... E04G 21/0472 264/34
3,294,605 A * 12/1966 Fischer ..... D03D 1/02 156/65
3,338,001 A * 8/1967 Fraser ..... E04H 15/20 52/2.21
3,480,023 A * 11/1969 McConnell ..... E04H 15/62 135/125
3,857,209 A * 12/1974 Milliken ..... E04H 15/22 52/2.17
3,909,992 A * 10/1975 Stachiw ..... E04B 1/169 52/2.15
3,924,363 A * 12/1975 Candle ..... E04H 15/22 52/2.24
4,031,674 A 6/1977 Rand ..... E04H 15/22 52/2.14
4,094,109 A * 6/1978 Prouvost ..... E04B 1/169 249/65
4,155,967 A 5/1979 South et al. ..... E04B 1/3211 264/45.2
4,262,457 A * 4/1981 Darmstadt ..... E04H 15/20 52/2.17
4,324,074 A 4/1982 South ..... E04B 1/3505 52/2.15
4,384,435 A * 5/1983 Polise ..... E04H 15/20 D25/19
4,569,362 A * 2/1986 Fidler, Jr. ..... 135/126
4,665,935 A 5/1987 Nichols
4,833,837 A * 5/1989 Bonneau ..... E04H 15/20 52/2.19
4,901,481 A 2/1990 Seeley, Jr. ..... E04H 15/20 52/2.15
5,005,322 A * 4/1991 Mattick et al. ..... E04H 15/20 52/25
5,247,768 A * 9/1993 Russo ..... E04H 15/20 52/2.13
5,555,681 A * 9/1996 Cawthon ..... A01G 9/16 52/63
5,628,336 A 5/1997 Lee
5,893,238 A 4/1999 Peacock ..... E04H 15/20 52/2.18
5,918,438 A 7/1999 South ..... E04B 1/169 264/32
6,119,408 A * 9/2000 Page ..... E04H 15/22 52/2.17
6,192,633 B1 2/2001 Hilbert ..... E04H 1/1277 52/2.18
6,203,261 B1 3/2001 South
6,382,223 B1 * 5/2002 Lah ..... E04H 15/34 135/114
6,722,084 B2 4/2004 Berman ..... E04H 15/006 135/120.1
6,840,013 B2 1/2005 South ..... E04B 1/169 52/2.15
7,013,607 B1 3/2006 South ..... E04B 1/169 264/131
7,128,078 B2 10/2006 Chang
7,135,332 B2 * 11/2006 Ouellette ..... F24V 99/00 435/290.1
7,168,116 B2 * 1/2007 Reger ..... E04H 15/20 135/125
7,290,378 B2 * 11/2007 Kalnay ..... B64G 9/00 244/158.3
D608,406 S * 1/2010 Cobb, II ..... E04B 7/102 52/80.1
7,765,746 B2 * 8/2010 Reed ..... E04H 1/1277 52/2.18
7,954,504 B2 6/2011 Price
8,615,966 B2 12/2013 Thompson ..... E04H 15/20 52/2.13
8,752,336 B1 * 6/2014 Ozsuer ..... E04H 15/22 52/2.19
9,901,840 B2 * 2/2018 Hollowell ..... A63H 33/008
9,995,055 B1 * 6/2018 Currid ..... E04H 15/62 135/125
2003/0060308 A1 * 3/2003 Miller et al. ..... F41H 11/00 473/415
2003/0213512 A1 * 11/2003 Lee ..... E04H 15/20 135/126
2004/0065026 A1 * 4/2004 Wilson ..... E04B 7/102 52/80.1
2006/0049195 A1 * 3/2006 Koussios ..... B29C 70/222 220/581
2009/0145046 A1 * 6/2009 Thoeny ..... E04H 15/20 52/2.15
2011/0180669 A1 * 7/2011 Johnson ..... B64G 9/00 244/158.3
2012/0291362 A1 * 11/2012 Milo ..... E04H 15/20 52/2.21
2014/0020306 A1 * 1/2014 Binienda ..... E04H 15/20 52/25
2021/0252415 A1 * 8/2021 Hanley ..... A63H 33/008

FOREIGN PATENT DOCUMENTS

DE 2636748 A1 * 2/1978 ..... A01G 9/1415
DE 10062845 A1 * 11/2002 ..... E04H 15/20
GB 743835 A * 1/1956
GB 925673 A * 5/1963
GB 1409067 A * 10/1975
JP 06288124 A * 10/1994 ..... E04H 15/22

OTHER PUBLICATIONS

Photo 1: Image of the hoisting connection apparatus of Photo A, 2012.
Photo 2: Image of the Photo A form partially hoisted and partially inflated, 2012.
Photo 3: Image of a temgorary wood blockout form, 2014.
Photo 4:Concrete dome sitting on concrete columns with a flexible "skirt" draped around the columns, 2010.
Photo 5: Renderings of a concrete dome roof, with traditional stud framed exterior walls. Dome roof resting on concrete columns, 2011.
Photo 6: Concrete dome being used age planetarium structure, within a structural steel building, 2013.
Photo 7: Artist's rendering of a water tank concept, 2008.
Photo 8: Desktop conceptual model of a water tank concept, 2008.
Photo B: Concrete dome being used as a planetarium structure, 1999.
Photo A: Dome Technology Photo; https://www.facebook.com/DomeTechnology/photos/a.347594532724.148848.346577372724/443860707724/?type=3&theater; purportedly dated Oct. 26, 2010.
Photo B: Dome Technology Photo; https://www.facebook.com/DomeTechnology/photos/a.500766002724.271718334657737272 4/10150142176007725/?type=3&theater; purportedly dated Apr. 5, 2011.

(56) References Cited

OTHER PUBLICATIONS

Photo C: Dome Technology Photo; https://www.facebook.com/DomeTechnology/photos/a.10152396201202725.1073741827.346577372724/10152396193397725/?type=3&theater; purportedly dated Aug. 26, 2014.
Photo D: Dome Technology Photo; https://www.facebook.com/DomeTechnology/photos/a.10152396201202725.1073741827.346577372724/10152396193312725?type=3&theater; purportedly dated Aug. 26, 2014.

* cited by examiner (A-A)

(B-B)

(A-A)

(A-A)

AIRFORM FOR FACILITATING CONSTRUCTION OF A STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

In general, the subject matter contained herein relates to the field of monolithic dome structures or other permanent structures. More particularly, but not exclusively, the subject matter relates to air-inflated and air-supported forms ("airforms") used for enabling construction of permanent monolithic dome structures.

2. Discussion of Related Field

Monolithic dome structures may be constructed using airforms. One end of an airform may be attached to a foundation, and thereafter the airform may be inflated. Sustained pressure within the inflated airform is maintained until a polyurethane layer is applied to the wall of the airform, a metal lattice is erected adjacent the polyurethane layer, concrete is applied to the metal lattice and polyurethane, and the polyurethane and concrete layers are permitted to cure, thus forming a self-supported shell structure.

Conventional airforms may extend superiorly in an oblique configuration from the foundation to define a shape that resembles a portion of a sphere. Headroom and/or other conventionally accessible and usable space (for human interaction and storage) at the structure's perimeter along the inside circumference of the airform, and therefore the eventual dome structure, may be adversely affected due to the oblique configuration, thereby negatively affecting the vertically-usable area of the structure. Thus, there is a need to provide a monolithic dome structure with increased usable space.

Further, due to the oblique configuration of the dome structures, it is difficult to install doors, windows, multiply-stacked domes, and other architectural features that are planar or otherwise shaped differently than conventional domes. Certain of such architectural features may be more easily provided if the dome structure has vertical walls. However, conventional domes that have been placed atop vertical walls are often formed of a different material and process as the dome structures. Employing different materials and processes between the dome, vertical support wall, doors, windows, and other features can cause long-term maintenance, water-tightness, or structural problems that might otherwise be avoided with a monolithic single-shell construction. Thus, there is a need to provide a monolithic dome structure that accommodates integrated architectural features having shapes and surfaces that vary from the shape of the dome structure.

Yet, when conventional airforms with transitions that vary from one shape to another (such as from a cylindrical vertical wall to a spherically-domed top) are placed under pressure, wrinkles are formed in the material of the airform along the transition portion between the two shapes. These wrinkles are similar to those seen along the circumference of a mylar birthday balloon. However, such wrinkles, if formed during the process of constructing a habitable structure, can cause suboptimal structural and/or aesthetic defects along any transition portion between two different shapes or surfaces of the structure. Thus, there is a need for a monolithic dome structure having varied shapes and/or surfaces without wrinkles, distortions, or other aberrations formed along transitions portions between such shapes and/or surfaces.

In light of the foregoing discussion, an improved airform and associated processes for facilitating construction of a structure enabling improved space utilization, varied shapes and/or surfaces, and/or no wrinkles, distortions, or other aberrations may be desired.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION

The present disclosure relates to an airform that can be inflated for facilitating construction of a structure, such as a monolithic structure, including without limitation a monolithic dome structure, or any other shaped structure.

The following description illustrates principles, which may be applied in various ways to provide many different alternative embodiments. This description is not meant to limit the inventive concepts in the appended claims. The principles, structures, elements, techniques, and methods disclosed herein may be adapted for use in other situations where undesirable wrinkles occurring in inflatable structures, such as airforms, are desired to be removed.

While exemplary embodiments of the present technology have been shown and described in detail below, it will be clear to the person skilled in the art that changes and modifications may be made without departing from its scope. As such, that which is set forth in the following description and accompanying drawings is offered by way of illustration only and not as a limitation. In addition, one of ordinary skill in the art will appreciate upon reading and understanding this disclosure that other variations for the technology described herein can be included within the scope of the present technology.

Figure 1A:
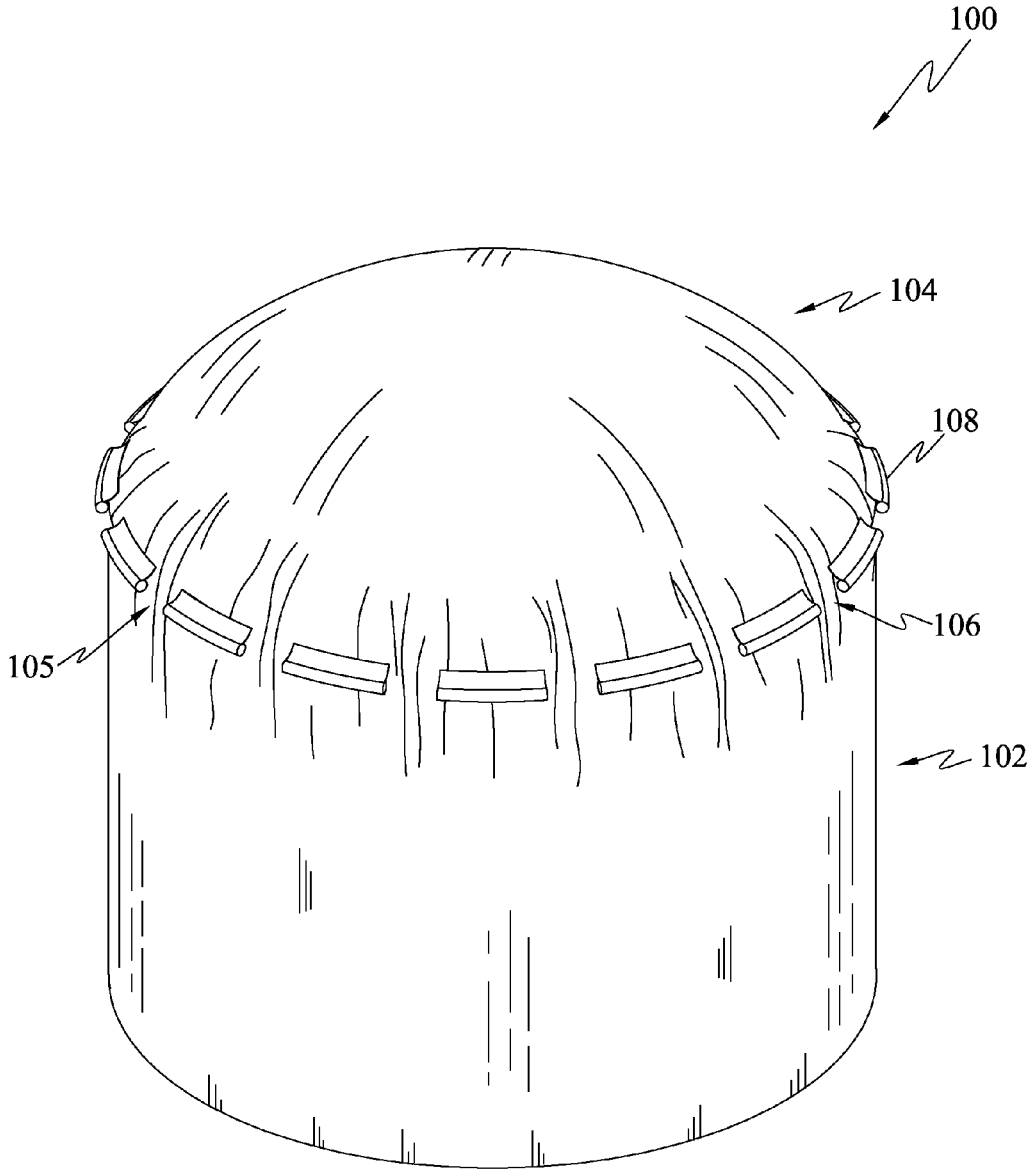
FIG. 1A is a perspective view of an airform in which wrinkles are formed, at the connection of a dome and a vertical wall, as a result of air pressure within the airform.
Figure 1B:
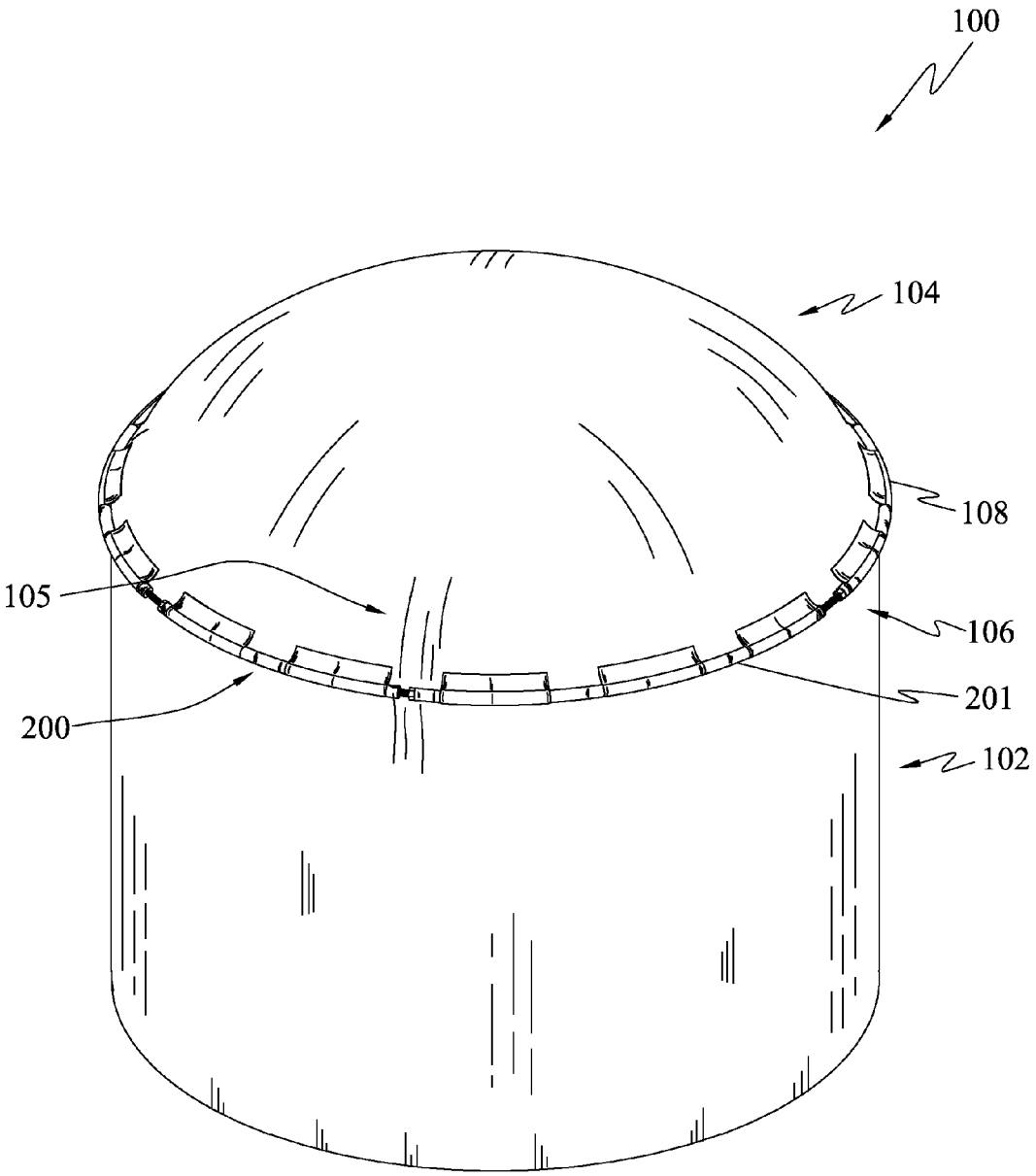
FIG. 1B is a perspective view of the airform of FIG. 1A to which reinforcement, such as a restrained compressive junction stiffener, is provided, and a wrinkle is still present in the airform.
Figure 1C:
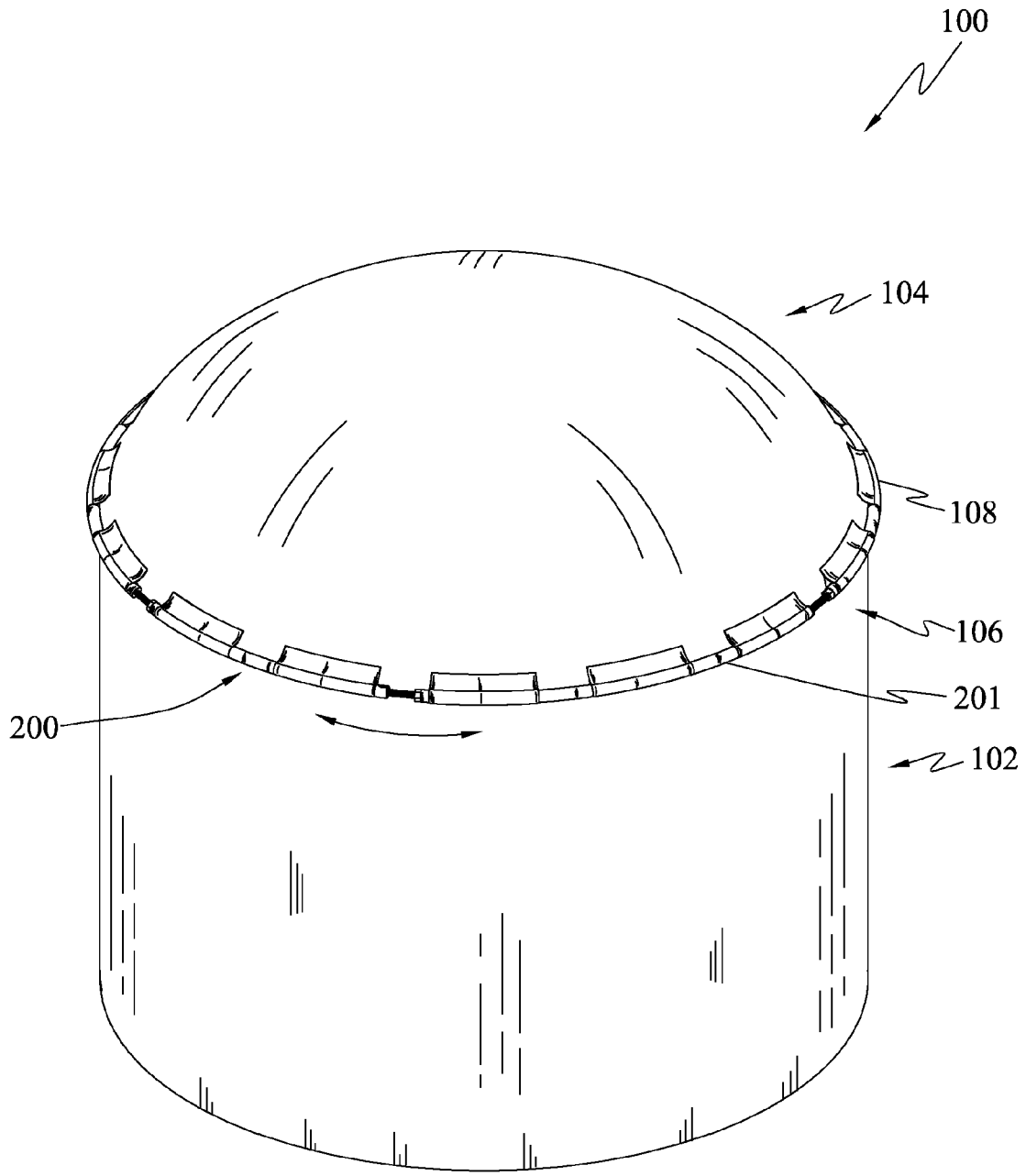
FIG. 1C is a perspective view of the airform of FIG. 1B in which the wrinkle has been removed by adjusting the reinforcement, such as by expanding or otherwise lengthening the restrained compressive junction stiffener.

Referring to FIG. 1A, an airform 100 for enabling construction of one or multiple monolithic dome structures may be provided. The airform 100 may be inflatable and reinforced, and upon inflation and reinforcement, the airform 100 may resemble the size and shape of the monolithic dome structure that may be constructed as per a template defined by the airform 100.

The airform 100 may have an open end towards its inferior side or inferior end. The open end of the airform 100 may be attached or otherwise engaged to a foundation. The open end may be engaged to the foundation such that a substantially airtight engagement may be formed along a perimeter or periphery of the open end. The airform 100 may be equipped with a mechanism to engage the airform 100 with an inflating device. The inflating device may pump air into the airform 100, to inflate the airform 100 to achieve a desired shape. In addition to inflating the airform 100, the inflating device may facilitate in retention of requisite pressure inside the airform 100 such that the airform retains the desired shape. The airform 100 may provide access to the inside or enclosed area of the inflated airform 100 to construction personnel such that, when personnel ingress or egress the airform 100, the pressure inside the inflated airform 100 is not lost substantially. Such access may be enabled by providing dual doors in the airform 100, in which there may a corridor in between the doors. The construction personnel may open and enter a first door, and thereupon close the first door, and subsequently open and enter a second door, and then close the second door. The corridor between the doors may also be inflated.

The airform 100 may include a first portion 102, a second portion 104 and at least one reinforcement retainer, such as loops 108. The first portion 102 of the inflated airform 100 may be of cylindrical shape, another dome shape, a singly- or multiply-curved surface around a principal axis, a window, a door, a hallway, an interconnecting structure, and/or any other varied shape or surface. The second portion 104 or a superior end of the inflated airform 100 may be a radial shape, such as a shape that resembles a portion of a sphere, oval, or quasi-sphere with an irregular, increasing, or decreasing radius of curvature, and may be disposed distally from the foundation when the airform 100 is inflated. The second portion 104 may alternatively or additionally be of cylindrical shape, another dome shape, a singly- or multiply-curved surface around a principal axis, a window, a door, a hallway, an interconnecting structure, and/or any other varied shape or surface. The first portion 102 may transition into the second portion 104 at a transition portion 106, such that the cylindrical shape transits into the radially-shaped portion. The shape of the airform 100 may be based on the desired shape of the monolithic dome structure. The first portion 102 of the airform 100 may be predominantly vertical when inflated.

The transition portion 106 may define a curved or smooth transition, as opposed to a sharp transition, when the airform 100 is inflated but not reinforced. Further, striations, dimples or wrinkles 105 may be formed in the transition portion 106, the first portion 102 and/or the second portion 104. It may be desirable to have a sharp transition from the first portion 102 to the second portion 104, or a transition that defines a sharp or hard angle. Such a transition may facilitate inclusion of doors and windows in the monolithic dome structures, and may also define ample headroom even at the perimeter of the airform 100, and therefore the eventual structure. Further, removal of the wrinkles 105 may be desired since in certain construction processes the airform 100 is retained as an outer shell of the final structure, and wrinkles may be aesthetically unpleasant. Furthermore, even if the airform 100 were to be removed after construction, the wrinkles may appear on the outer surface of the structure. Additionally, adjustments may have to be made while spraying concrete if such wrinkles 105 are present in the airform 100.

Reinforcement may be provided at the transition portion 106 or the portion of the airform 100 that may be desired to be the transition portion 106. The reinforcement may segregate the airform 100 into the first portion 102 and the second portion 104. The reinforcement may enable defining a transition portion that may have a sharp transition from the first portion 102 to the second portion 104, or a transition that defines a sharp or hard angle. Further, the reinforcement may enable disposing the first portion 102 vertically or perpendicularly to the foundation, such that ample headroom may be defined even at the perimeter of the airform 100. Furthermore, the reinforcement may enable elimination or removal of unwanted wrinkles 105 from the airform 100.

Referring to FIGS. 1A-2B, the loops 108 may be provided along the transition portion 106. The loops 108 may be engaged to the transition portion 106 by techniques such as heat welding, sewing, adhesive, mechanical connection, or other means of attachment. The loops 108 may enable providing reinforcement 200 to the airform 100 at the transition portion 106. The loops 108 may be provided at predetermined gaps or intervals along the perimeter of the transition portion 106. The loops 108 may be configured such that reinforcement members 201 may be passed through the loops 108. The loops 108 may be made of the same or a different material as the airform 100.

Figure 2A:
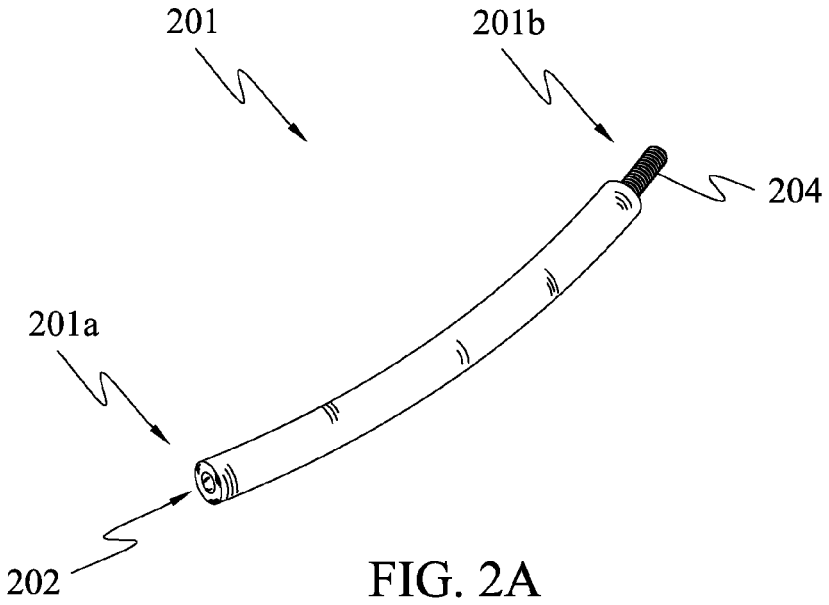
FIG. 2A is a perspective view of a reinforcement member.
Figure 2B:
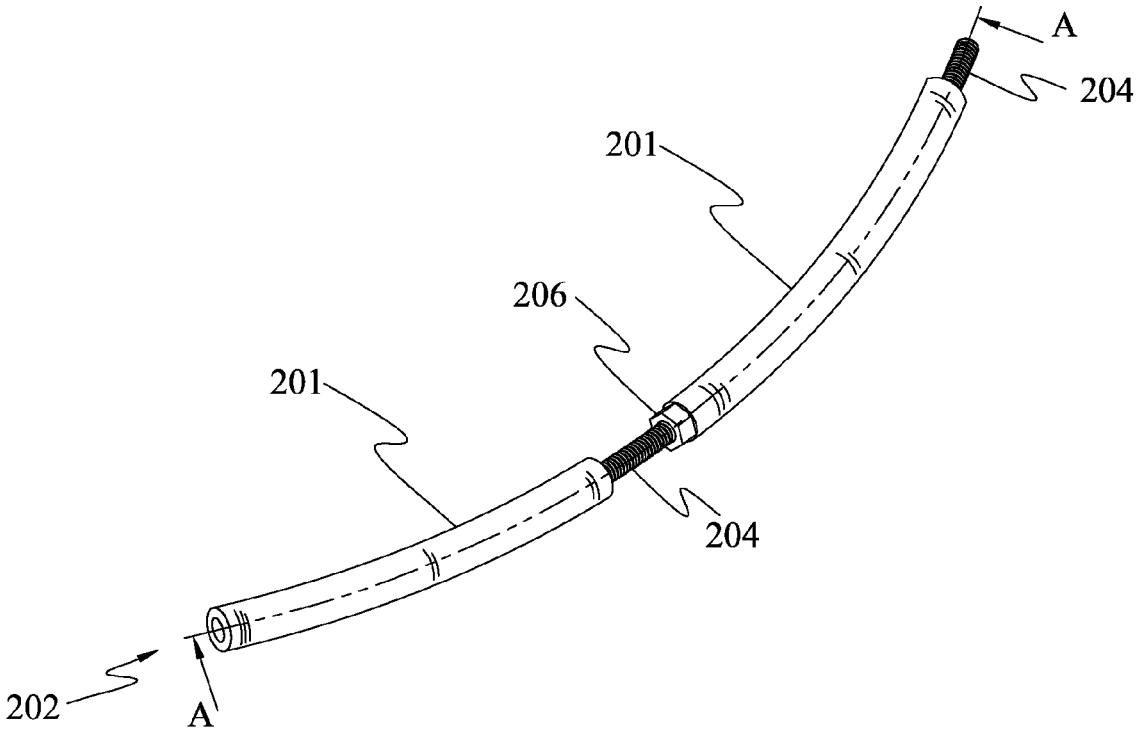
FIG. 2B is a perspective view illustrating engagement between two reinforcement members of the type illustrated in FIG. 2A.

The reinforcement 200 may be formed of a plurality of reinforcement members 201. A plurality of reinforcement members 201 may be joined together to form the reinforcement 200. Referring to FIGS. 2A-2B, each reinforcement member 201 may have a curved longitudinal axis. The curvature of the axis may depend on the curvature and shape of the airform 100 or the transition portion 106. Further, the number of reinforcement members 201 used to form the reinforcement 200 may depend on the length of the circumference or perimeter of the transition portion 106.

The reinforcement member 201 may include one or more mating, locking, or engagement mechanisms at a first end 201a and a second end 201b that may enable engagement with another reinforcement member 201 at each of its ends 201a, 201b. The reinforcement members 201 may be engaged or arranged to form a closed loop. At the first end 201a a slot or aperture or bore 202 may be provided. At the second end 201b a protrusion 204 may be provided. The bore 202 of a first reinforcement member 201 may be configured to receive the protrusion 204 of a second reinforcement member 201. The protrusion 204 may include threading defined on the external surface of the protrusion 204. A nut 206 may be engaged to the protrusion 204. Adjustment of the nut 206 may enable controlling the extent of insertion of the protrusion 204 into the bore 202. Hence, adjustment of one or more such nuts 206 may enable alteration of the length of the perimeter of the reinforcement 200. Increasing the perimeter may result in stretching or tensioning of the first portion 102 and the second portion 104, which may in turn result in stretching the transition portion and thereby removal of wrinkles 105. A wrinkle 105 may be removed by manipulating one or more reinforcement members 201 proximal to the wrinkle 105. Referring to FIG. 2D, a cross sectional view of the engagement of the threaded protrusion 204 with the nut 206 is illustrated.

Figure 2C:
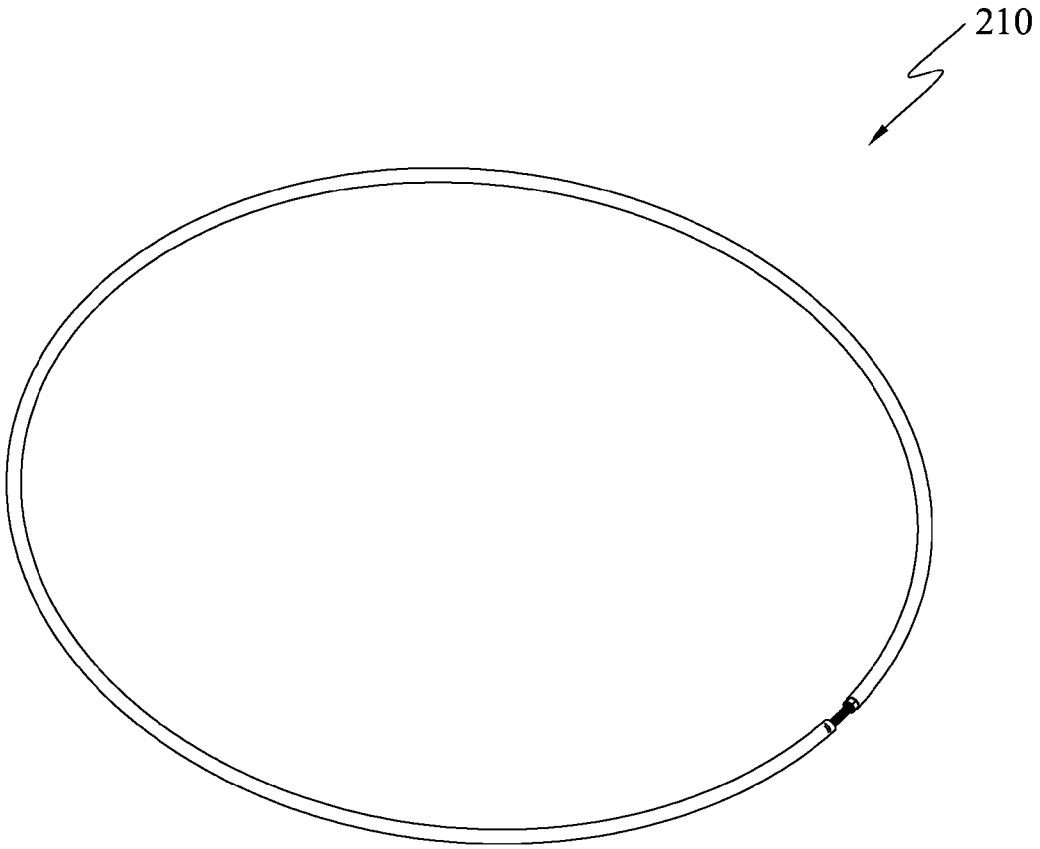
FIG. 2C is a perspective view of an alternative embodiment of a reinforcement member.
Figure 2D:
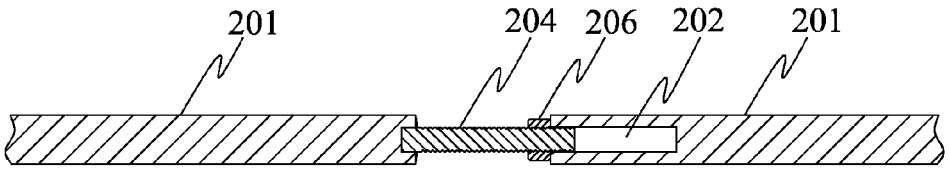
FIG. 2D is a partial cross sectional view (A-A) of the engagement illustrated in FIG. 2B.
Figure 2E:
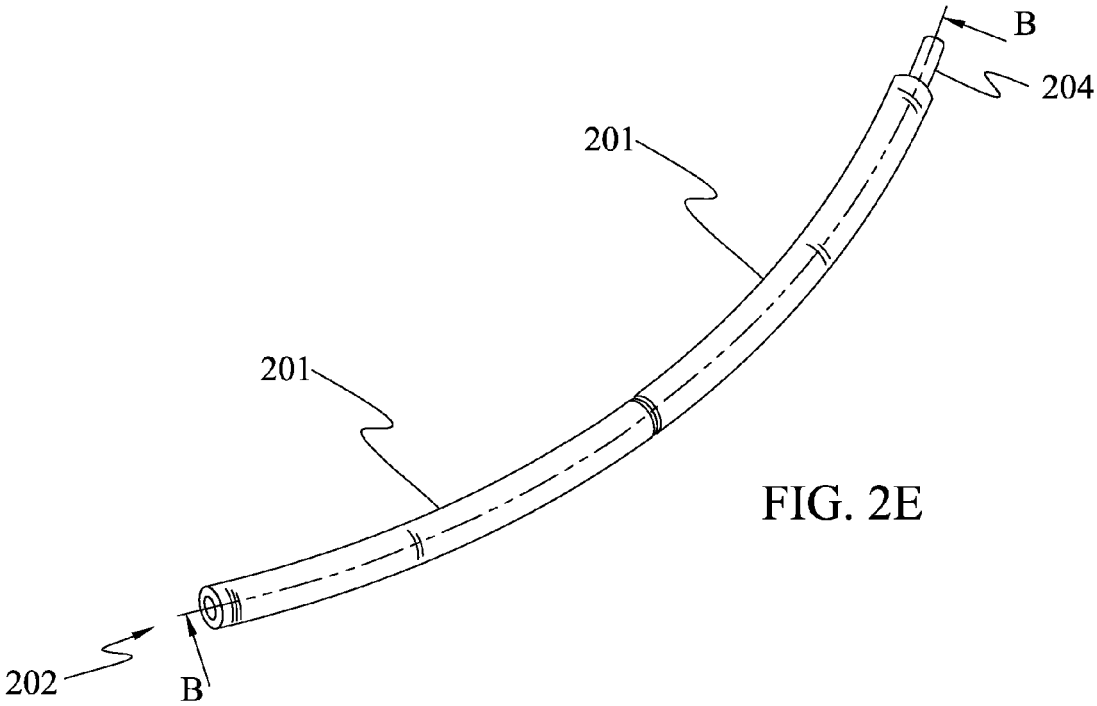
FIG. 2E is a perspective view illustrating engagement between two reinforcement members, each having a non-threaded protrusion.
Figure 2F:
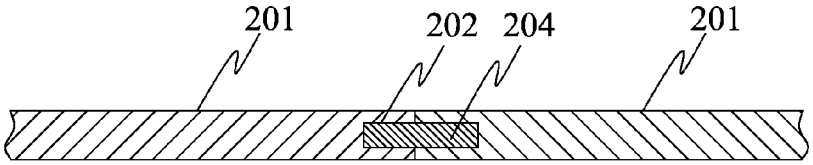
FIG. 2F is a cross sectional view (B-B) of the engagement illustrated in FIG. 2E.

Referring to, FIGS. 2E and 2F some of the reinforcement members 201 may not have threaded protrusions; rather the protrusion 204 may be non-threaded or may have a plain surface (alternatively and/or additionally, the protrusion 204 may include an irregular, geared, notched, keyed, starred, or other surface). The non-threaded protrusion 204 may be received by the bore 202 of an adjacent reinforcement member 201. An interference fit or friction fit may be established between the bore 202 and the non-threaded protrusion 204.

The protrusion 204 may define one or more diametrically extending bores. Alternatively or additionally, a diametrically extending bore may be formed in the protrusion 204. Further, a stop may be inserted through the bore after the position of the nut 206 is finalized. Such an arrangement may prevent movement of the nut 206 away from the finalized position when the structure is placed under pressure.

Figure 1D:
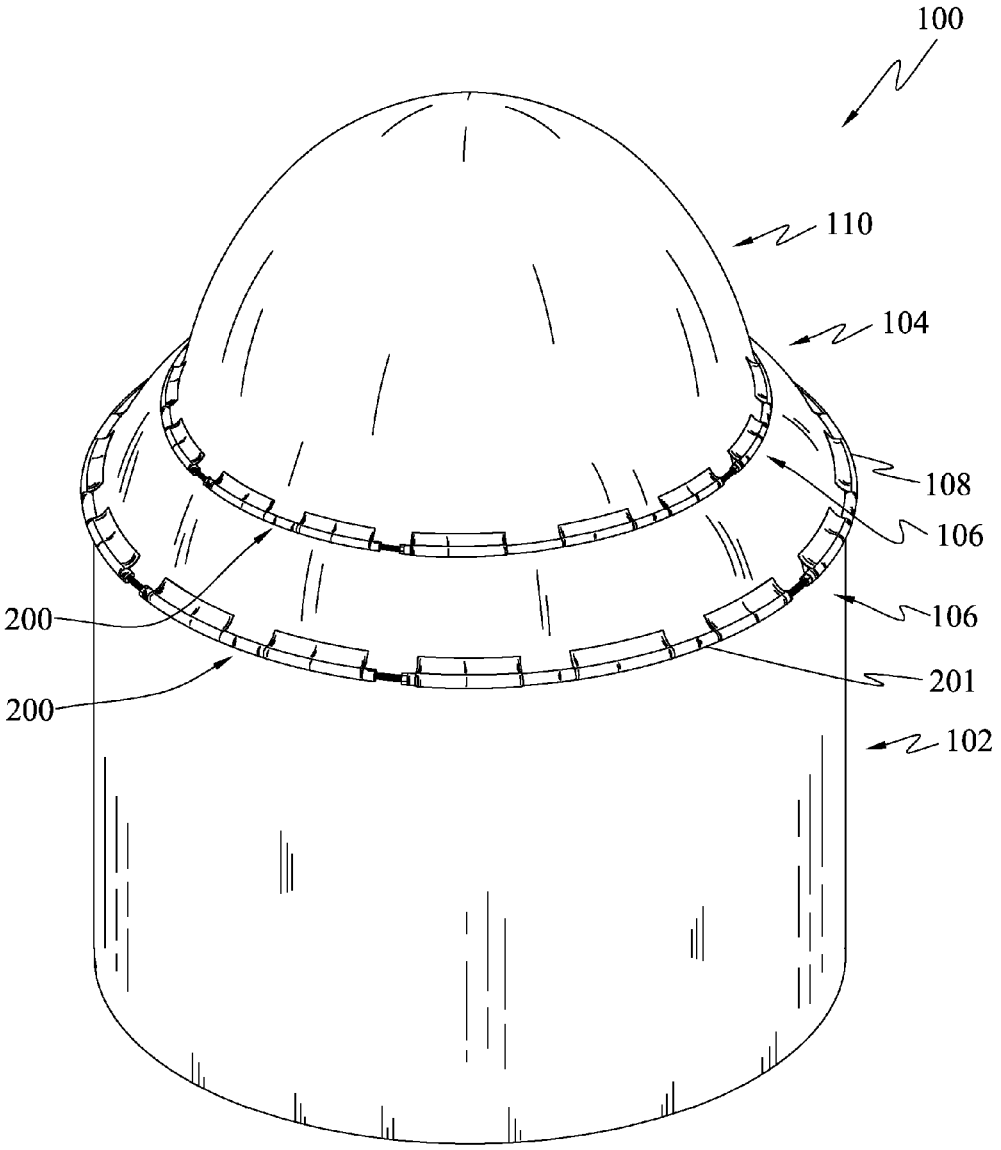
FIG. 1D is a perspective view of an alternative embodiment of an airform in which multiple transition portions are provided and reinforced between a cylindrical shape and a dome shape and between two different dome shapes.
Figure 1E:
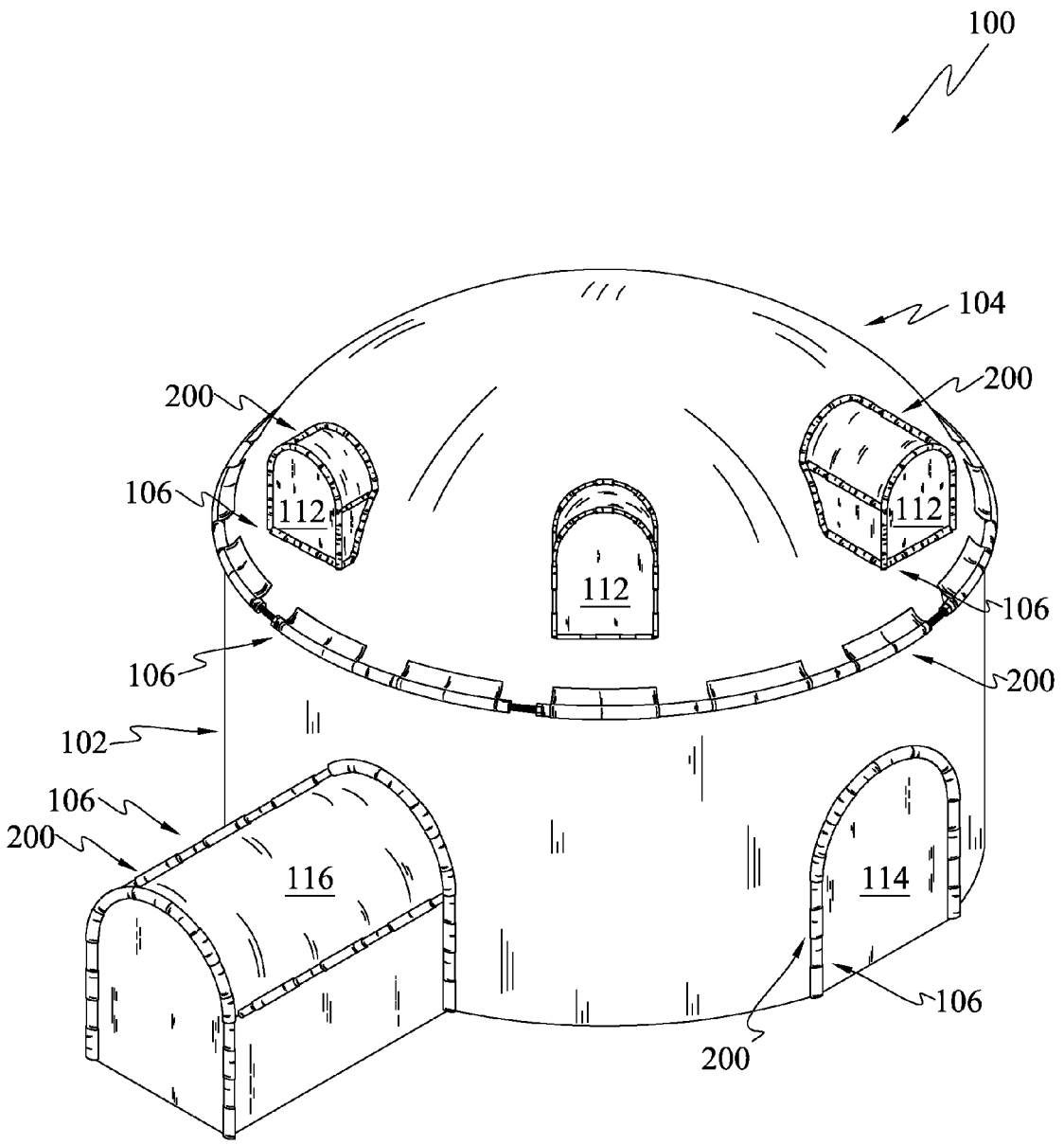
FIG. 1E is a perspective view of an alternative embodiment of an airform in which multiple transition portions are provided and reinforced between windows frames, a door frame, a hallway or connection portion between one or more monolithic structures, a cylinder, and a dome.

Referring to FIGS. 1D and 1E, multiple transition portions 106 may be defined. Reinforcement 200 may be provided at each of the transition portions 106. The transition portions 106 may be concentric (FIG. 1D), irregular (FIG. 1E), and/or intermittent (FIG. 1E). Each of the transition portions 106 may define a same angle of transition. Alternatively, at least one of the transition portions 106 may define an angle of transition that may differ from angle(s) of transition defined at the remaining transition portion(s) 106. FIG. 1D shows two concentric transitions portions 106 forming a transition from a vertical cylindrical wall of a first portion 102 to a radial sphere or quasi-sphere of a first dome of a second portion 104, and forming a transition from the second portion 104 to a smaller and taller radial or quasi-sphere of a second dome of a third portion 110. FIG. 1E shows an airform 100 in which multiple transition portions 106 are provided and reinforced between at least three windows frames 112, a door frame 114, a hallway or connection portion 116 between one or more monolithic structures, a cylinder or first portion 102, and a dome or second portion 104.

Referring to FIG. 2C, a single reinforcement member 210 may form the requisite reinforcement. The reinforcement member 210 may be flexible in nature. The reinforcement member 210 may define a circular configuration. Ends of the reinforcement member 210 may be engaged with each other to define a closed loop. One or more mating, locking, or engagement mechanisms may be provided, such as those described previously, which can be manipulated to alter the length of the perimeter of the reinforcement member 210.

Figure 3A:
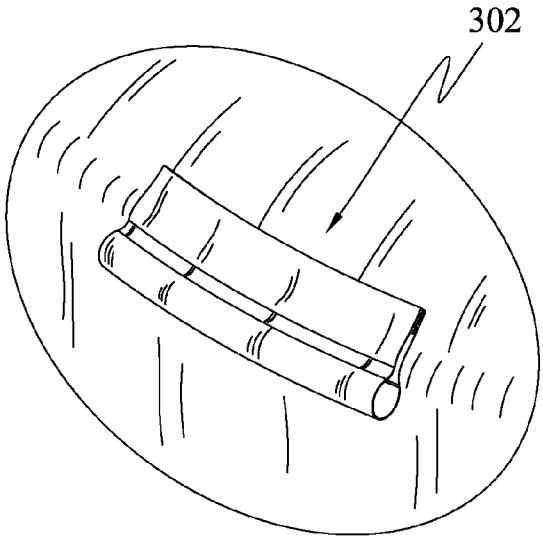
FIG. 3A is a perspective view of a loop, which has a hook and loop type mechanism, adaptable with an airform.
Figure 3B:
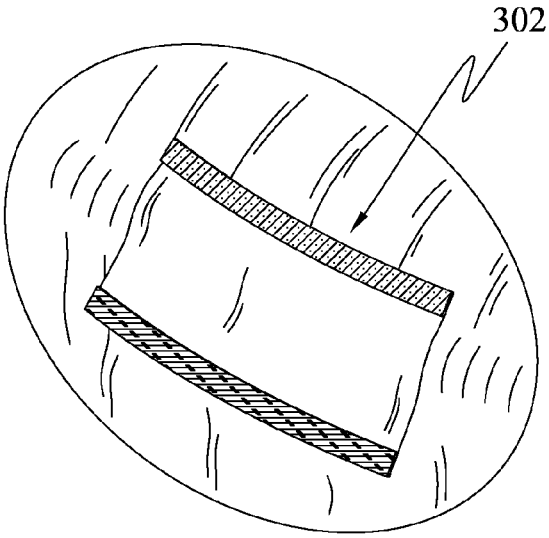
FIG. 3B is the loop of FIG. 3A in which loop of the mechanism is separated from the hook of the mechanism.
Figure 3C:
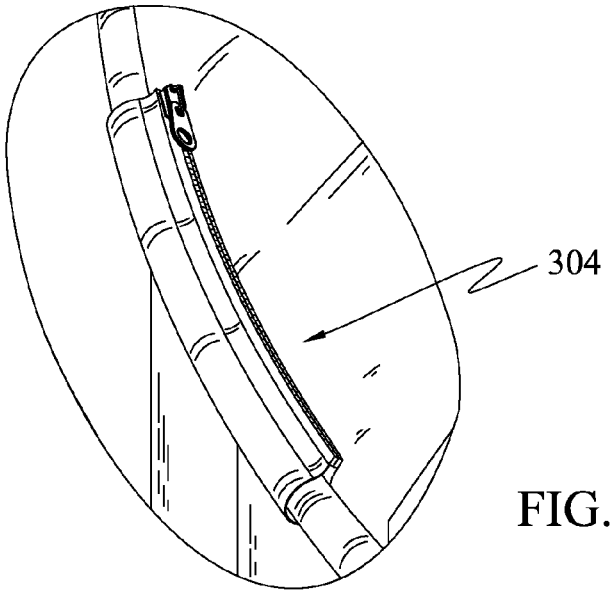
FIG. 3C is a perspective view of a loop, which has a zip fastening mechanism, adaptable with an airform.

FIGS. 3A-3C illustrate multiple embodiments of loops capable of being opened for insertion of a reinforcement member into the loop, closed around a reinforcement member, and re-opened for removal and/or reclamation of the reinforcement member. Various loop, sleeve or other retention or retainer members may be used to connect transition portions of the airform with a variety of one or more reinforcement members. For example, U.S. Pat. Nos. 6,192,633, 5,893,238, 6,722,084, 4,901,481, 4,031,674, 4,665,935, 7,954,504, 5,628,336, 7,128,078, and 8,615,966 illustrate a variety of tent structures with inflatable or structural members interfacing with sleeves. The elements, principles, structures, techniques, and methods of the aforementioned patents may be combined in any manner with any of the elements, principles, structures, techniques, and methods of the present invention disclosed herein. All of the subject matter and disclosure of the aforementioned patents is incorporated herein by reference in its entirety.

Referring to FIGS. 3A-3B, at least one reinforcement retainer, such as loops 302, may be provided for receiving reinforcement. The loops 302 may hang from the transition portion 106. One or more loops 302 may include a hook and loop type fastener such that loops can be selectively formed by operating the hook and loop type fastener. A hook mechanism may be provided on or towards a first edge of the loop 302 and a loop mechanism may be provided on or towards a second edge, opposite the first edge, of the loop 302. Upon engaging the hook and loop mechanism, the loop 302 may be formed, which may be configured to receive the reinforcement. The formation of the loop 302 may facilitate selective usage of the loops 302 based on requirements of the user. The loops 302 may be formed based on user requirements to form the loops 302 to enable reception of the reinforcement. In an embodiment, some of the loops may be fastened to the airform 100 by adopting hook and loop mechanisms. The position of such loops relative to the airform may be altered based on user requirements.

Referring to FIG. 3C, at least one reinforcement retainer, such as loops 304, may be provided for receiving reinforcement. One or more loops 304 may include a zip fastening mechanism such that the loops can be selectively formed by operating the zip fastening mechanism. The loops 304 may be selectively formed by operating the zip fastening mechanism. The zip fastening mechanism may be configured such that one end of the loop 304 may include one row of the zip fastening mechanism and the other end of the loop 304 may include another row with protruding teeth. The ends may be brought together and a slider of the zip fastening mechanism may be slid over the two rows, thereby interlocking the rows and forming the loop 304. In an embodiment, a zip fastening mechanism may be used to fasten the loops to the airform 100. The zip fastening mechanism may be configured such that, one row of the zip fastening mechanism with protruding teeth may be provided on the airform 100 and the other row of the zip fastening mechanism with protruding teeth may be provided on the loops 304. The slider of the zip fastening mechanism may be slid over the two rows, thereby interlocking the two rows and attaching the loop 304 to the airform 100.

Figure 4:
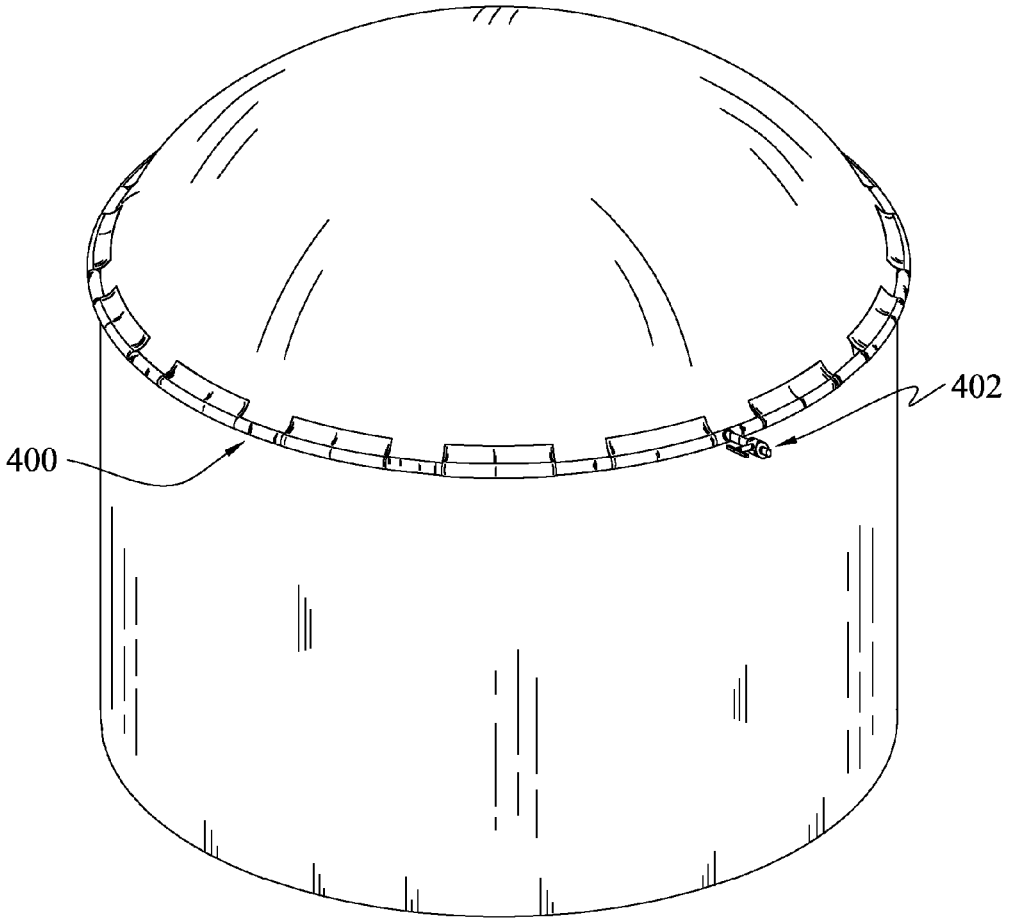
FIG. 4 is a perspective view of an airform adapted with a reinforcement member which is inflatable.

Referring to FIG. 4, an inflatable reinforcement member 400 may be provided. The reinforcement member 400 may be a flexible pipe or tube whose ends may be engaged to define a closed loop. The reinforcement member 400 may include a valve 402 which may be adapted with an inflating device to inflate the reinforcement member 400. The reinforcement member 400 may be inflated using fluid, which may include liquid and/or gas. Wrinkles may be removed by manipulating or altering the pressure created by the fluid. The pressure created by the fluid may vary from the pressure at which the airform is retained. The pressure created by the fluid may be higher compared to the pressure at which the airform is retained.

Figure 5A:
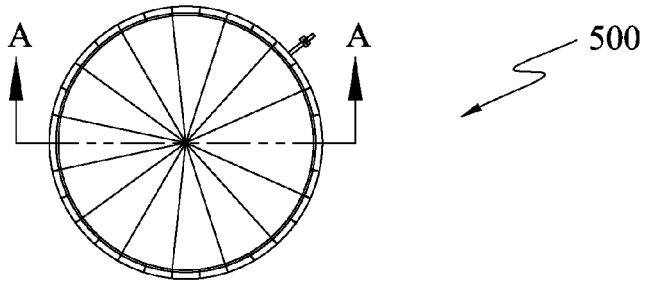
FIG. 5A is a top view of an airform defining a continuous airtight loop or pocket which is inflatable.
Figure 5B:
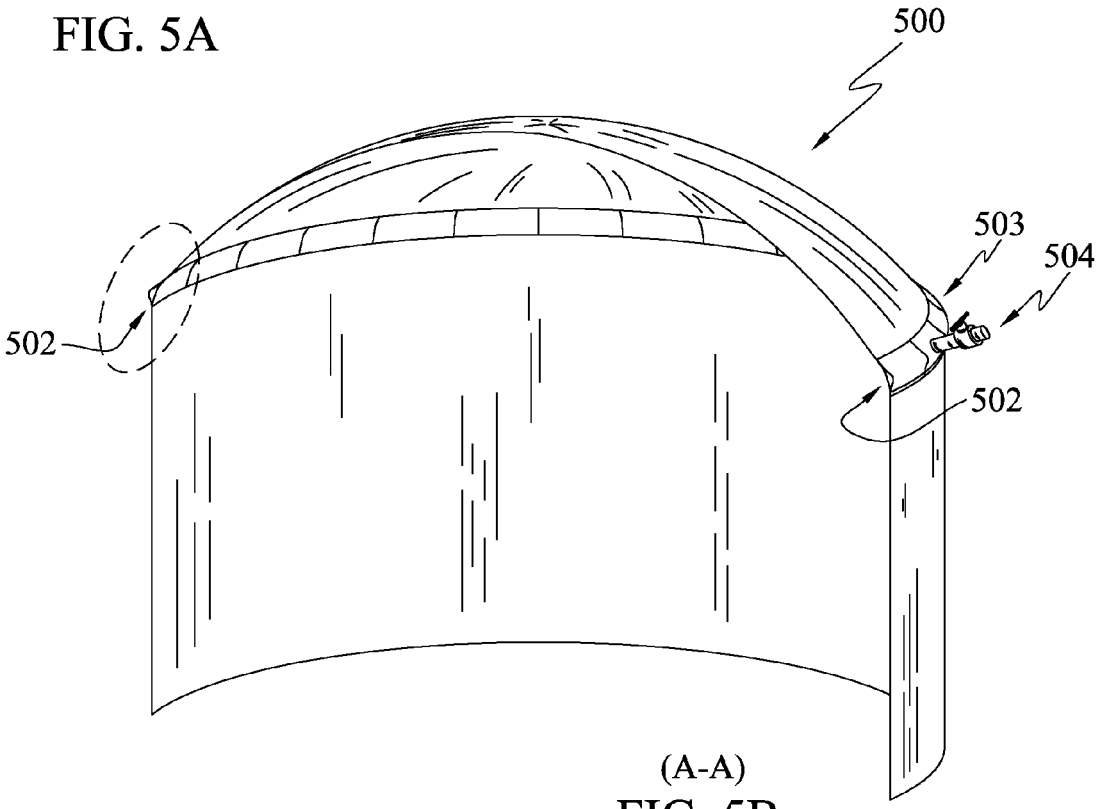
FIG. 5B is a perspective sectional view along line A-A of the airform of FIG. 5A.
Figure 5C:
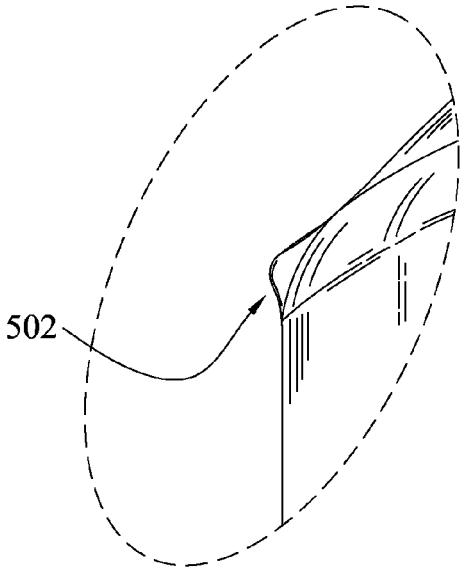
FIG. 5C is a detailed perspective sectional view of the pocket provided in the airform of FIG. 5B.

Referring to FIGS. 5A-5C, a single continuous airtight reinforcement retainer, such as a loop 502, tube, or pocket, may be provided along the perimeter of a transition portion 503 of an airform 500. The loop 502 may include a mechanism 504, such as a valve, for connecting the loop 502 to the inflating device. The loop 502 may be configured to be in inflated using fluid. The inflated loop 502 may function as the reinforcement to the airform 500. Wrinkles may be removed by manipulating or altering the pressure created by the fluid. The pressure created by the fluid may vary from the pressure at which the airform is retained. In order to remove the wrinkles, the pressure created by the fluid may be higher compared to the pressure at which the airform is retained.

Figure 6A:
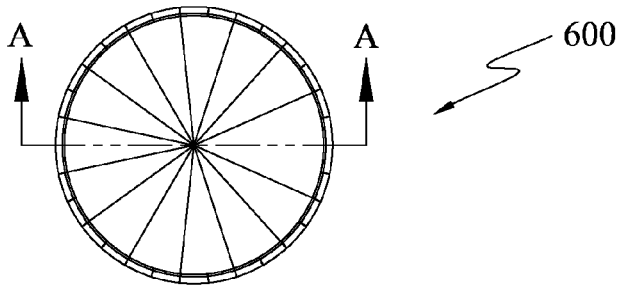
FIG. 6A is a top view of an airform having multiple layers of flexible sheets provided along a perimeter of a transition portion.
Figure 6B:
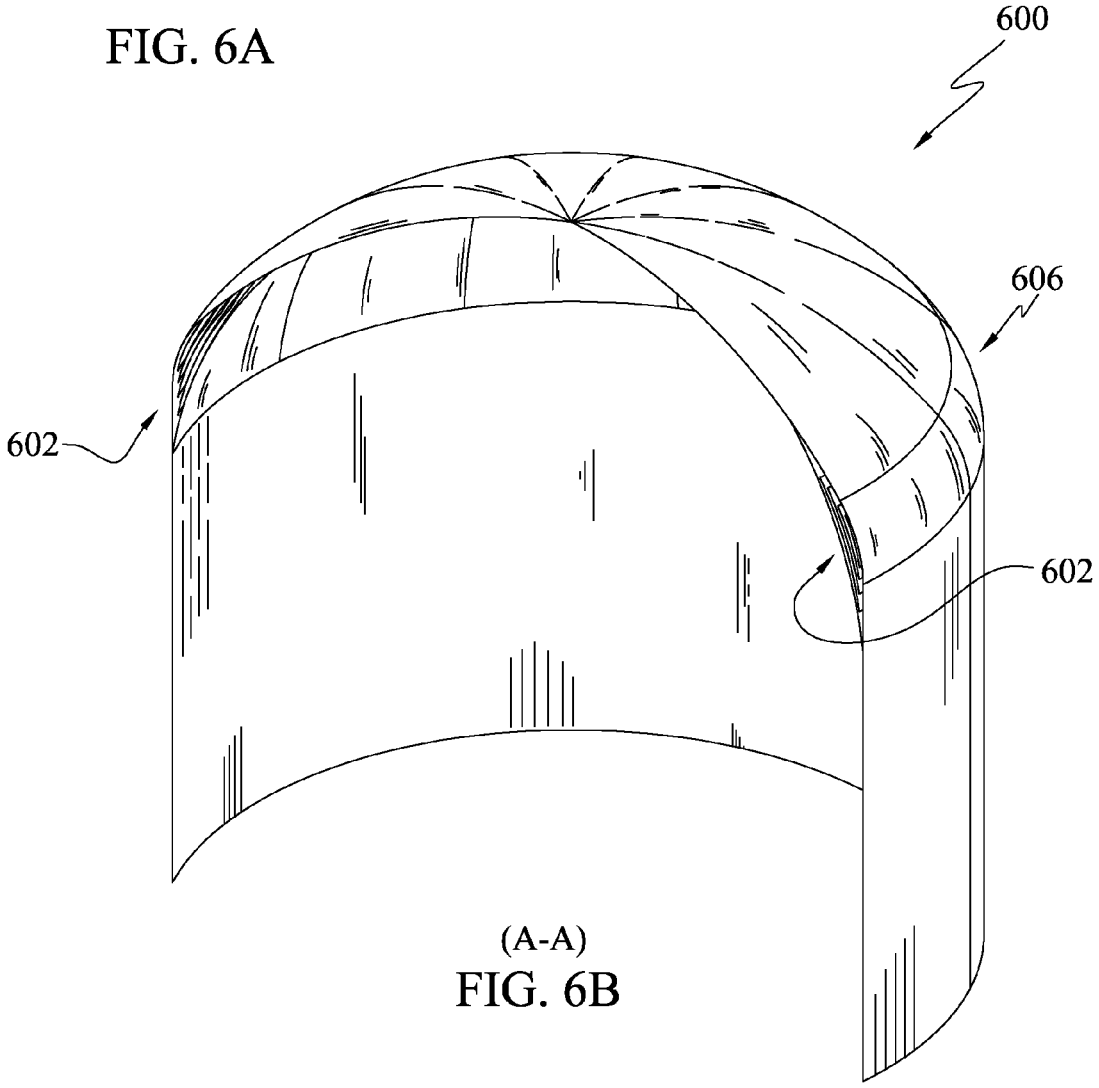
FIG. 6B is a perspective sectional view taken along line A-A of the airform of FIG. 6A.

Referring to FIGS. 6A-6B, a reinforcement 602 in the form of one or more (e.g., multiple) layers of flexible sheets may be provided in the airform 600. The flexible sheets of material may be formed of any material compatible with the airform 600, and such sheets may be heat welded, glued, sewn, hermetically sealed, or otherwise secured in an airtight and water-tight connection to each other. The reinforcement 602 may be provided along the perimeter of a transition portion 606 of the airform 600. The multiple layers of flexible sheets provided along the perimeter of the transition portion 606 of the airform 600 may increase the thickness and stiffness of the area along the perimeter of the transition portion 606. The flexible sheets may be made of the same or different material as the airform 600 or its various portions. Various portions of the airform 600 and transition portion 606 may have materials of different rigidity and strength in order to help provide structural stiffness to the airform and transition portion capable of minimizing or removing wrinkles or other surface aberrations. The multiple layers of flexible sheets reinforce the area around the transition portion 606, which may be prone to wrinkles Upon inflating the airform 600, the presence of reinforcement 602 along the perimeter of the transition portion 606 restricts or limits the formation of wrinkles in the airform 600.

The first portion and the second portion and any other multiple portions of the airform may be configured to define a singular or monolithic airform. The reinforcement may be removed from the airform after a solid structure is built along the airform, and the structure is capable of retaining the desired shape absent air pressure within the air form.

Figure 7A:
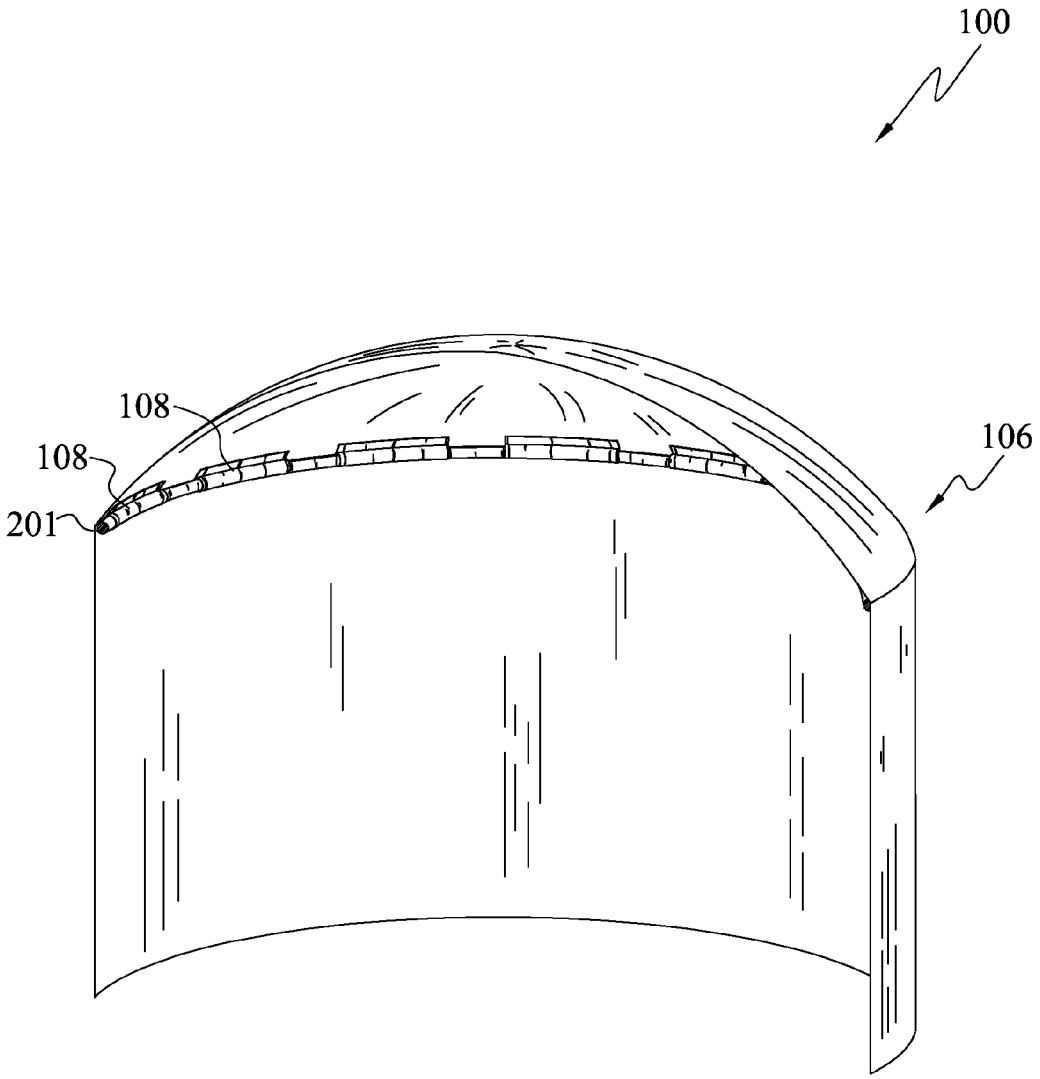
FIG. 7A is a perspective sectional view illustrating an airform with one or more reinforcement members along an inner circumference of the airform.
Figure 7B:
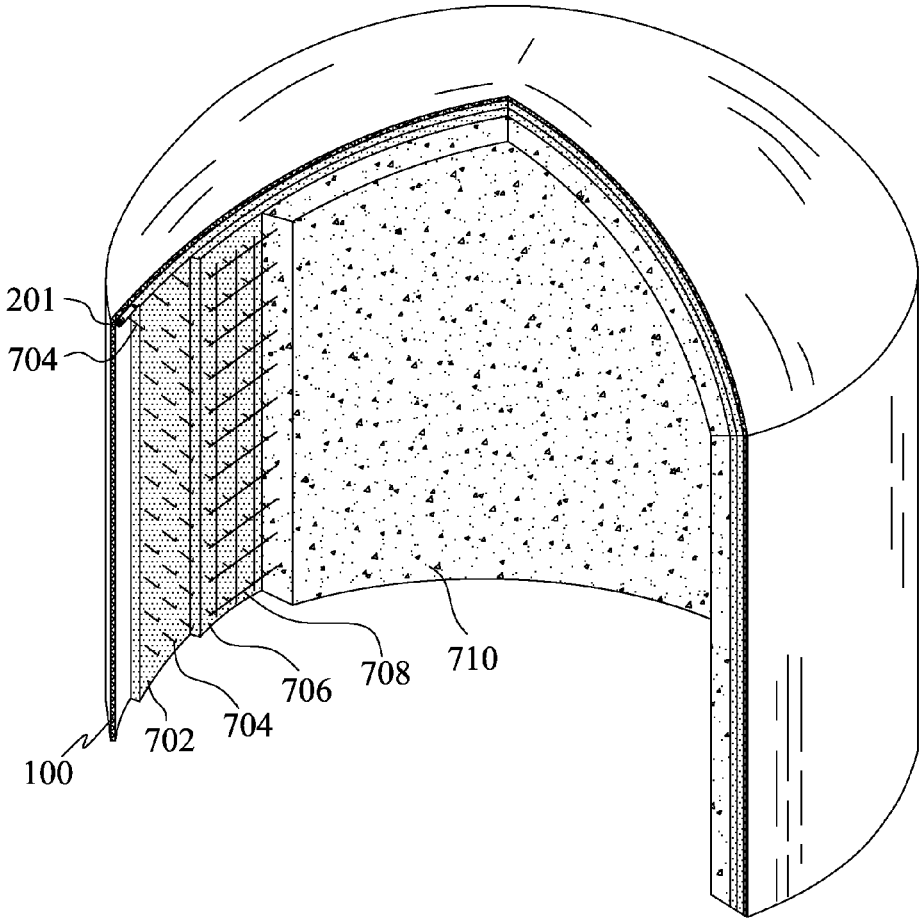
FIG. 7B is a perspective sectional view illustrating several layers of a monolithic structure formed within the airform of FIG. 7A.
Figure 7C:
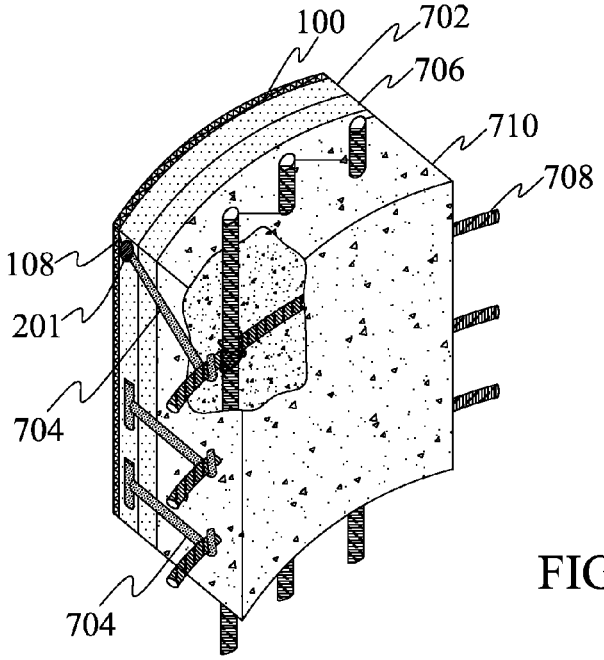
FIG. 7C is an enlarged cutout view of the layers illustrated in FIG. 7B.

Referring to FIGS. 7A through 7C, the airform 100 may include at least one reinforcement retainer, such as loops 108, along the inner circumference of a transition portion 106 on the inside surface of the airform 100. The loops 108 may retain one or more reinforcement members 201 or reinforcement hangers 201 on the inner surface of the airform 100. Any portion of any inner surface of the airform 100 may include any number of reinforcement retainers and/or reinforcement members. The reinforcement 200 described on the exterior surface of the airform in any or all of the various figures of this disclosure may be inverted, that is, placed on the interior surface instead of the exterior surface, of the airform. For example, the reinforcement 200 shown and described on the exterior surface of the airform with reference to FIGS. 1B, 1D, 1E, 3A-3C, 4, and 8A-8C may be provided as reinforcement 200 on the inner surface or interior of the airform at any location of the airform.

The structure built as per the template of the airform 100 may include several layers formed of different materials. The airform 100 may be inflated and reinforced to remove wrinkles or striations, if any. Upon inflation of the airform 100, the construction process may be begun either from the inside of the inflated airform or from the outside of the inflated airform 100, based on a chosen method of construction. If construction is carried out from the inside of the inflated airform 100, the airform 100 may form the outer layer of the structure. Alternatively, if construction is carried out from the outside of the inflated airform 100, the airform 100 may form the inside layer of the structure. The structure may include the airform 100, a first layer of sprayed polyurethane foam 702, rebar hangers 704 embedded in the first layer of polyurethane foam, a second layer of polyurethane foam 706 as desired to embed and retain the rebar hangers 704 or otherwise provide additional insulation or structural support, steel, metal, or other rigid reinforcement 708 arranged as per design specification and concrete 710 of desired thickness sprayed over the steel reinforcement 708.

The first layer of polyurethane foam 702 may be sprayed onto to the inflated airform 100, permitting rebar hangers 704 to extend through the first layer of polyurethane foam 702 from the reinforcement hangers 201. Additional or alternative rebar hangers 704 may be embedded in the first layer of sprayed polyurethane foam 702 at suitable positions. The rebar hangers 704 facilitate in attaching the steel reinforcement to the airform 100. The second layer of polyurethane foam 704 may be sprayed onto the earlier layers, thereby embedding the rebar hangers 704. Upon embedding the rebar hangers 704, steel reinforcement 708 may be arranged as per design specification, considering the doors, windows, vents and/or chimney, among others, to be provided in the structure. Concrete 710 of desired thickness may be sprayed to complete the structure. Upon setting of the concrete 710, the structure may be complete. The airform 100 may be retained under a suitable pressure until the concrete sets. The airform 100 may be separated from the structure and reused.

Other internal and/or external structures in addition to and/or instead of rebar hangers 704, steel reinforcements

708, and/or concrete 710 may be used in conjunction with the structures, features, benefits, methods, steps, and processes of the present disclosure. For example, a furring strip or other internal and/or external structure may be placed along the internal and/or external vertical, horizontal, circumferential, spherical, quasi-spherical, irregular, and/or other surface(s) of the airform. The furring strip (of wood, PVC, or other penetrable and/or fixable material), or other structure, may then be used to anchor or otherwise affix auxiliary structures or materials (such as hangers 704, steel reinforcements 708, concrete 710, siding, flashing, rain gutter, and/or other structures).

Figure 8A:
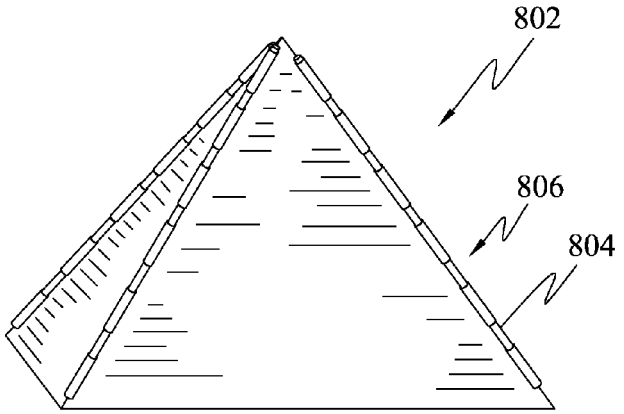
FIG. 8A is a perspective view of an airform resembling a pyramid.

Referring to FIG. 8A, an airform 802 may be provided to resemble a pyramid. Reinforcement 804 may be provided at one or more transition portion 806 so that the desired transition is achieved and/or wrinkles if any may be removed.

Figure 8B:
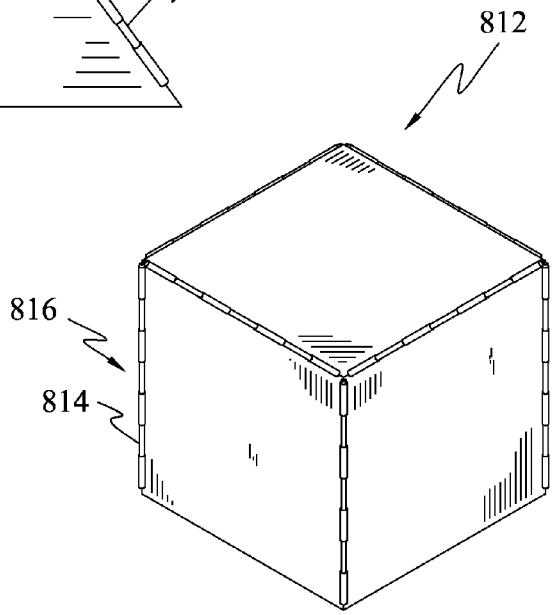
FIG. 8B is a perspective view of an airform resembling a cube.

Similarly, referring to FIG. 8B, an airform 812 may be provided to resemble a cube. Reinforcement 814 may be provided at one or more transition portion 816 so that the desired transition is achieved and/or wrinkles if any may be removed.

Figure 8C:
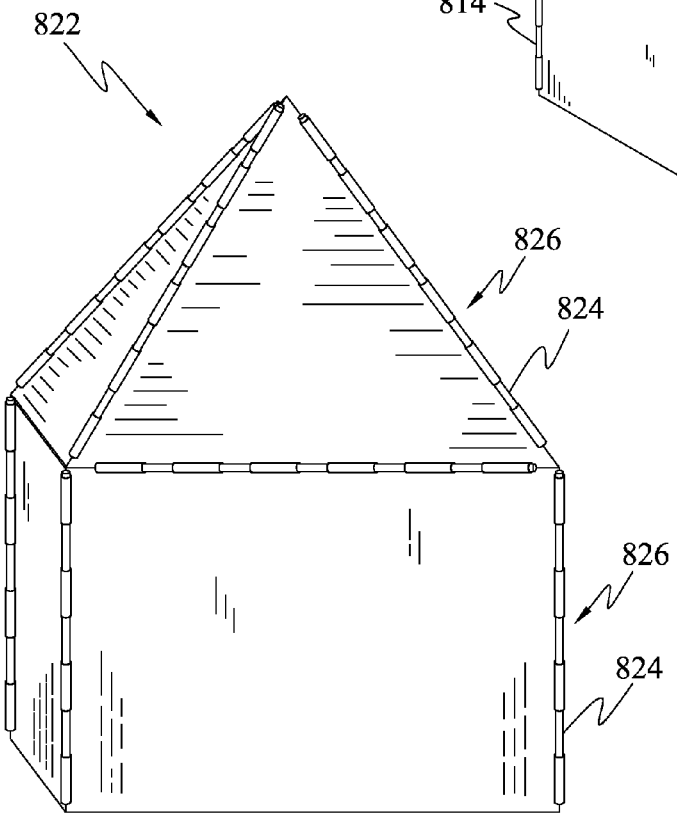
FIG. 8C is a perspective view of an airform resembling a pyramid disposed over a cube.

Likewise, referring to FIG. 8C, an airform 822 may be provided to resemble a pyramid disposed over a cube. Reinforcement 824 may be provided at one or more transition portion 826 so that the desired transition is achieved and/or wrinkles if any may be removed. In light of this disclosure, other shapes may be contemplated, and FIGS. 8A to 8C are merely examples of a variety of curved or linear shapes, ellipses, etc. that may be employed.

FIGS. 8A to 8C include straight reinforcements 824 that may buckle at certain weak inflection points along the length of the reinforcement members and under the internal air pressure of a fully-inflated and pressurized airform. In other embodiments with straight sections, sigmoid sections, or other sections of reinforcement members that do not follow the natural profile and geometry of a fully-inflated and pressurized airform, such as the examples in FIGS. 8A through 8C, it may be preferable to further strengthen such reinforcement members. Reinforcement members may be strengthened by using stronger, more rigid materials (such as metal alloys or carbon fiber materials) to form the reinforcement members and/or by using additional structure on or surrounding each of the reinforcement members (such as increased diameter, straight or bent I-beam geometries, triangular or truss like geometries, supplemental sleeves, or other structures and geometries). By providing additional strength along at least a portion of each reinforcement member where such member is likely to bend, buckle, or otherwise deform when the airform changes shape under pressure, the airform is more likely to retain a desired shape influenced by the reinforcement members whenever such members are present and adequately strengthened.

In an embodiment, reinforcement may be provided for reinforcing the airform and thereby remove wrinkles that may be formed upon inflating the airform. The reinforcement provided may be such that shape of the reinforcement may facilitate collection of water which may drip down from the top of the structure. The reinforcement may function as a rain gutter around the structure and facilitate collection and disposal of rain water dripping from the roof of the structure.

The reinforcement members may be made of materials, such as steel, PVC pipes, wires, cables and rigid canvas, among other suitable materials. The airform may be made of material capable of withstanding inflation and/or providing protection against nature's elements.

In an embodiment, a design of a structure or a monolithic dome structure to be constructed may be finalized. An airform may be manufactured to complement the design of the structure. The airform may be manufactured by joining several sheets which may be joined using techniques such as heat welding. Foundation may be prepared for the structure. An inferior end of the airform may be engaged to the foundation. Subsequently, the airform may be inflated and a requisite pressure may be retained inside the airform. Reinforcement may be provided to the airform, and the reinforcement may be adjusted or manipulated such that wrinkles, striations, dimples or other surface aberrations, if any, formed on the airform are removed. The airform may be sprayed and other preparation steps may be carried out to ready the airform for rest of the construction steps. The construction steps may include spraying a polyurethane foam or other insulation against the inside surface of the airform and/or erection of steel or other reinforcement inside the airform or outside, depending on the chosen construction technique. Concrete of desired thickness may be sprayed over the steel reinforcement, insulation, and/or airform. Once the concrete structure is capable of retaining the desired shape, mechanisms that may be used to retain the airform at requisite pressure may be turned off. The airform may be left on the structure or may be reused.

What is claimed is:

1. An *inflatable* airform [that can be inflated for facilitating construction of a permanent structure, the airform] *for building construction,* comprising:

a first portion comprising a first *complete* surface of revolution when the airform is inflated, wherein the first portion is configured to be disposed in a first shape and to form a first profile when the airform is inflated;

a second portion comprising a second *complete* surface of revolution when the airform is inflated, wherein the second portion is configured to be disposed in a second shape and to form a second profile when the airform is inflated;

wherein at least one of the following *is present*: the first *complete* surface of revolution is configured to be different than the second *complete* surface of revolution, the first shape is configured to be different than the second shape, or the first profile is configured to be different *than* the second profile, when the airform is inflated;

at least one transition portion comprising at least one portion of the airform that defines a transition from the first portion to the second portion when the airform is inflated, wherein the first portion and the second portion share at least one common radius of revolution at the transition when the airform is inflated;

at least one reinforcement comprising at least one reinforcement member [provided] *located* at the at least one transition portion, wherein the at least one reinforcement [enables defining the] *defines a* transition *point* from the first portion to the second portion and [maintaining] *maintains* the first shape and the second shape when the airform is inflated; and at least one reinforcement retainer configured to retain *the* at least one reinforcement member at the at least one transition portion;

*wherein the at least one reinforcement comprises a plurality of reinforcement members;* and wherein the airform is configured to facilitate the construction of a permanent structure.

[2. The airform of claim 1, wherein the at least one reinforcement comprises a plurality of reinforcement members.]

3. The airform of claim [2] *1*, wherein the plurality of reinforcement members are configured to be engaged to each other to form a closed loop encircling the at least one transition portion, wherein the closed loop comprises a perimeter.

4. The airform of claim 3, wherein [said engagement is] *the plurality of reinforcement members are* configured to be manipulated to alter the length of the perimeter of the closed loop.

[5. The airform of claim 1, wherein the first portion further comprising a first at least one radius of curvature when the airform is inflated;

wherein the second portion further comprising a second at least one radius of curvature when the airform is inflated; and wherein at least one radius of curvature of the second at least one radius of curvature is different than at least one radius of curvature of the first at least one radius of curvature at the at least one transition portion when the airform is inflated.]

6. The airform of claim 1, further comprising at least one window and at least one door.

7. The airform of claim 1, further comprising a third portion configured to be disposed in a third shape when the airform is inflated, wherein the at least one transition portion further comprising at least one portion of the airform that defines a transition from the second portion to the third portion when the airform is inflated.

8. The airform of claim 1, wherein the at least one transition portion comprises a plurality of portions of the airform that define transition from the first portion to the second portion, wherein at least two of the plurality of portions of the airform are configured to be reinforced.

9. The airform of claim 1, wherein the first shape is cylindrical.

10. The airform of claim 1, wherein the second shape is doubly curved.

11. A method of preparing an airform that can be inflated for facilitating construction of a permanent structure, the method comprising:

inflating the airform of claim 1, such that the first portion of the airform is disposed in [said] *the* first profile, and the second portion of the airform assumes [said] *the* second profile, which *the second profile* is different [to] *than* the first profile[, then]*;* manipulating the at least one reinforcement at the at least one transition portion to remove at least one surface aberration extending across the at least one transition portion.

12. The method of claim 11, wherein [providing] *manipulating the* at least one reinforcement comprises assembling [a] *the* plurality of reinforcement members along the at least one transition portion of the airform.

13. The method of claim 11, wherein manipulating the at least one reinforcement comprises altering a perimeter of the at least one reinforcement for removing the at least one surface aberration.

14. The method of claim 11, wherein manipulating the at least one reinforcement comprises altering a dimension of the at least one reinforcement at least proximal to the at least one surface aberration.

15. The method of claim 11, wherein the second shape is doubly curved.

16. An [monolithic] *architectural* structure, comprising:

a [cement] *concrete* layer;

a structural layer of metal adjoining the [cement] *concrete* layer;

insulation adjoining the structural layer of metal; and the airform of claim 1 adjoining the insulation;

wherein the first portion of the airform is configured to be engaged to a foundation;

wherein the second portion of the airform is configured to be disposed distally from the foundation when the airform is inflated; and wherein the at least one reinforcement is configured to be manipulated for removing one or more striations, if any, at the at least one transition portion, when the airform is inflated.

17. The [monolithic] *architectural* structure of claim 16, wherein, the first portion extends perpendicularly from the foundation to the at least one reinforcement;

the second portion extends superiorly from the at least one reinforcement; and the second shape is doubly curved.

18. The [monolithic] *architectural* structure of claim 17, wherein the at least one reinforcement *comprises a rigid material and* is configured to be operable for manipulating [a] *the* material under tension at the at least one transition [portion].

19. The [monolithic] *architectural* structure of claim 16, wherein the [at least one reinforcement comprises a] plurality of reinforcement members *are* configured with ends that engage to define a closed loop, wherein engagement of the ends is configured to be manipulated to alter a dimension of the closed loop.

20. The airform of claim 7, wherein the third shape is doubly curved.

*21. An architectural structure, comprising:*

*a concrete layer;*

*a structural layer comprising metal adjoining the concrete layer;*

*an airform integrally connected to the structural layer, the airform comprising:*

*a first portion having a first complete surface of revolution when the airform is inflated to form a first profile;*

*a second portion having a second complete surface of revolution when the airform is inflated to form a second profile, wherein the first and second profiles are different;*

*a plurality of reinforcement members located at a transition between the first and second portions, wherein the first and second portions share a common radius of revolution at the transition between the first and second portions; and*

*one or more retainers configured to retain the plurality of reinforcement members;*

*wherein the airform is configured so as to be capable of facilitating construction of a permanent structure, and the plurality of reinforcement members define the transition from the first portion to the second portion and maintain the first profile and the second profile when the airform is inflated.*

*22. The architectural structure of claim 21, further comprising insulation adjoining the structural layer.*

*23. The architectural structure of claim 21, further comprising a foundation operably connected to the first portion.*

*24. A method of preparing an architectural structure, comprising:*

*providing an airform configured so as to be capable of facilitating construction of a permanent structure, the airform comprising:*

*a first portion having a first complete surface of revolution when the airform is inflated to form a first profile;*

*a second portion having a second complete surface of revolution when the airform is inflated to form a second profile, wherein the first and second profiles are different;*

*a reinforcement member located at a transition between the first and second portions, wherein the first and second portions share a common radius of revolution at the transition between the first and second portions; and*

*one or more retainers configured to retain the reinforcement member; and*

*inflating the airform;*

*wherein the reinforcement member defines the transition from the first portion to the second portion and maintains a first shape and a second shape when the airform is inflated; and*

*wherein the method further comprises assembling a plurality of reinforcement members along the transition of the airform.*

*25. The method of claim 24, further comprising removing at least one surface aberration extending across the transition.*

*26. The method of claim 24, further comprising altering a perimeter of the reinforcement member.*

* * * * *